(12) United States Patent
Yang et al.

(10) Patent No.: US 9,122,934 B2
(45) Date of Patent: Sep. 1, 2015

(54) OBJECT DETECTION METHOD WITH A RISING CLASSIFIER EFFECT AND OBJECT DETECTION DEVICE WITH THE SAME

(71) Applicant: AUTOMOTIVE RESEARCH & TESTING CENTER, Lugang Chen, Changhua Hsien (TW)

(72) Inventors: Chih-Hung Yang, Changhua Hsien (TW); Kuo-Ching Chang, Changhua Hsien (TW)

(73) Assignee: AUTOMOTIVE RESEARCH & TESTING CENTER, Lugang Chen, Changhua Hsien (TW)

( * ) Notice: Subject to any disclaimer, the term of this patent is extended or adjusted under 35 U.S.C. 154(b) by 75 days.

(21) Appl. No.: 14/141,505

(22) Filed: Dec. 27, 2013

(65) Prior Publication Data
US 2015/0186735 A1  Jul. 2, 2015

(51) Int. Cl.
*G06K 9/00* (2006.01)
*G06K 9/62* (2006.01)
*G06K 9/46* (2006.01)

(52) U.S. Cl.
CPC .......... *G06K 9/00805* (2013.01); *G06K 9/4604* (2013.01); *G06K 9/6267* (2013.01); *G06K 9/00832* (2013.01)

(58) Field of Classification Search
CPC .......... G06K 9/00805; G06K 9/69267; G06K 9/4604; G06K 9/00832; G06K 9/00838; G06K 9/00845
See application file for complete search history.

(56) References Cited

U.S. PATENT DOCUMENTS

| | | | |
|---|---|---|---|
| 7,366,325 B2 * | 4/2008 | Fujimura et al. | 382/104 |
| 7,899,211 B2 * | 3/2011 | Fujimoto | 382/104 |
| 8,330,816 B2 * | 12/2012 | Imamura | 348/148 |
| 8,411,145 B2 * | 4/2013 | Fardi | 348/148 |
| 2007/0147700 A1 * | 6/2007 | Jeong et al. | 382/266 |
| 2011/0206282 A1 * | 8/2011 | Aisaka et al. | 382/195 |

* cited by examiner

*Primary Examiner* — Manav Seth
(74) *Attorney, Agent, or Firm* — patenttm.us

(57) ABSTRACT

An object detection method with a rising classifier effect is embedded in an object detection device and has steps of acquiring image information; determining a position of an obstacle in the image information, wherein the image information is detected for generation of an extracted range corresponding to the obstacle; recognizing an extracted contour of the obstacle, wherein the extracted contour of the obstacle associated with the extracted range is obtained by using an algorithm for Poisson gradient vector flow based active deformable contour model and a multi-mesh algorithm with different grid sizes; and forming a maximum border of the extracted contour of the obstacle for a classifier to recognize a type of the obstacle according to the maximum border of the obstacle. Accordingly, the object detection method is advantageous in complete extraction, higher recognition rate, faster computation and feasibility to be integrated with vehicle systems.

11 Claims, 6 Drawing Sheets

OBJECT DETECTION METHOD WITH A RISING CLASSIFIER EFFECT AND OBJECT DETECTION DEVICE WITH THE SAME

BACKGROUND OF THE INVENTION

1. Field of the Invention

The present invention relates to an object detection method, and more particularly to an object detection method with a rising classifier effect.

2. Description of the Related Art

Recent dynamic object detection and recognition methods for recognizing various image formats can only extract certain portions of an obstacle in an image, and after dividing the extracted portions, can then determine to which type of object the Obstacle pertains by using an image comparison method to compare with other multiple known images. Hence, precision of the comparison and determination depends on integrity of the divided portions. In other words, when the extracted portions are too small, a complete obstacle contour is difficult to be pieced together because of discontinuous regions easily generated from each extracted portion. The consequence is an increased false recognition rate and lengthy search time.

If requiring calculation of image characteristic values of an image on each divided portion of the obstacle and a logical mechanism to determine types of objects of the images on the divided portions, the foregoing dynamic object detection and recognition methods are not easy to be integrated with existing embedded systems, and also have the issue of long processing time.

When the foregoing object detection and recognition methods are applied to recognize obstacles in the proximity of a vehicle in various occasions, such as while driving backwards or alerting for front-end collision, the methods are not appropriate for vehicular applications due to the drawbacks of being tune-consuming in image processing, high false recognition rate, and integration difficulties with existing vehicle systems. Moreover, conventional obstacle-locating techniques for vehicular applications equip vehicles with millimeter wave radar, which is advantageous in long measuring distance, stable operation, weatherproof capability, and capability of measuring distance and relative speed between vehicles, but disadvantageous in high equipment cost and operation cost.

There is another strategy for extracting obstacle of vehicle, that is, a dynamic extraction method. Such strategy has the advantage of requiring no other assistance equipment, but the disadvantage thereof is huge amount of calculation and long processing time.

SUMMARY OF THE INVENTION

An objective of the present invention is to provide an object detection method with a rising classifier effect and an object detection device with a rising classifier effect being advantageous in complete extraction, higher recognition rate, faster computation and feasibility to be integrated with vehicle systems.

To achieve the foregoing objective, the object detection method is performed by an object detection device embedded in a vehicle and has steps of:

acquiring image information;

determining at least one position of at least one obstacle in the image information, wherein the image information is detected for generation of at least one extracted range corresponding to the at least one obstacle, and a boundary of each of the at least one extracted range of a corresponding obstacle is taken as an initial extracted contour of the obstacle;

recognizing an extracted contour of each of the at least one obstacle, wherein the extracted contour of each of the at least one obstacle associated with a corresponding extracted range is obtained by using an algorithm for Poisson gradient vector flow based active deformable contour model and a multi-mesh algorithm with different grid sizes; and forming a maximum border of the extracted contour of each of the at least one obstacle for a classifier to recognize a type of the obstacle according to the maximum border of the obstacle.

To achieve the foregoing objective, the object detection device with a rising classifier effect is embedded in a vehicle and has an image acquiring unit, an image processing unit, and an output unit.

The image acquiring unit outputs at least one image.

The image processing unit is electrically connected to the image acquiring unit, is built in with an image processing procedure recognizing an obstacle in each of the at least one image with an algorithm for Poisson gradient vector flow based active de-formable contour model and a multi-mesh algorithm with different grid sizes.

The output unit is electrically connected to the image processing unit and outputs an obstacle alert signal generated after the image processing unit recognizes the obstacle in each of the at least one image.

The algorithm for Poisson gradient vector flow based active deformable contour model is used to convert image information into a flow field distribution. The calculus of variations is used to extract a contour of the obstacle. The multi-mesh algorithm is used to rapidly calculate out desired numerical values and achieve faster computing speed. When the object detection device is mounted in a vehicle, a road detection range can be configured according to a corresponding field of view to the vehicle. The object detection device does not require any additional sensor to perform conditional determination based on a specific road safety scenario and to provide dynamic object detection and recognition and an alerting function. Accordingly, the present invention enhances the recognition accuracy of a classifier, and resolves the issues of conventional dynamic object detection and image recognition methods having an increased false recognition rate, being time consuming in computation and failing to be integrated with existing vehicle systems.

Other objectives, advantages and novel features of the invention will become more apparent from the following detailed description when taken in conjunction with the accompanying drawings.

DETAILED DESCRIPTION OF THE INVENTION

Figure 1:
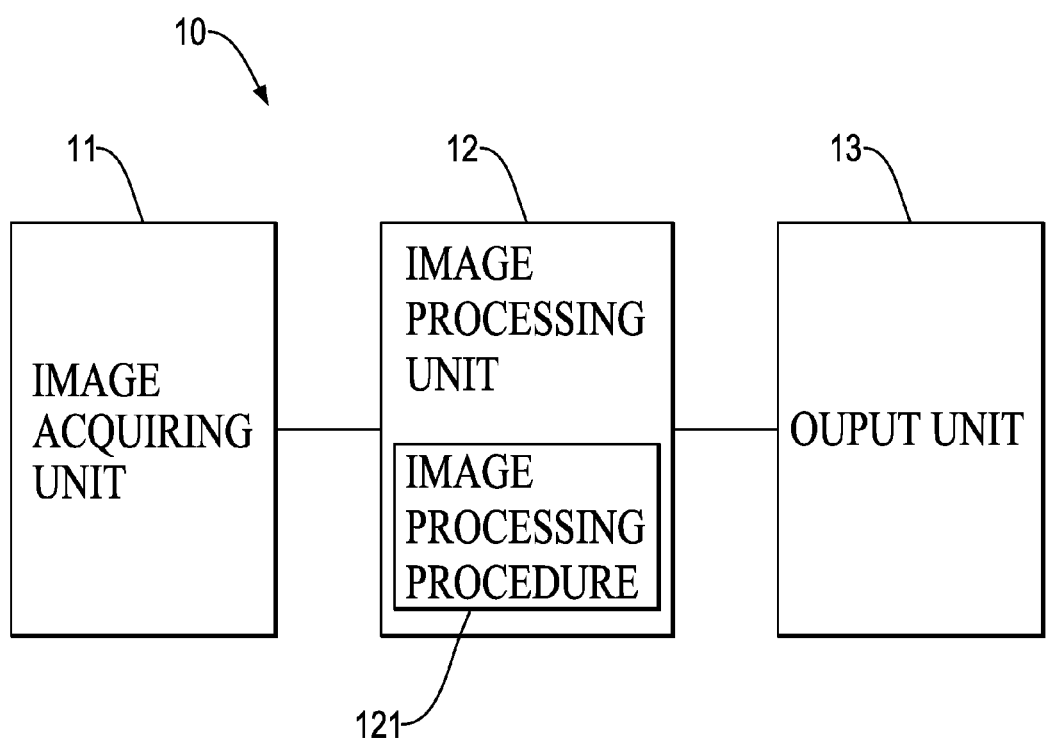
FIG. 1 is a functional block diagram of an object detection device in accordance with the present invention.

With reference to FIG. 1, an object detection device 10 with a rising classifier effect in accordance with the present invention is embedded in a vehicle and has an image acquiring unit 11, an image processing unit 12 and an output unit 13 sequentially connected to one another.

The image acquiring unit 11 acquires at least one image. The image processing unit 12 recognizes a contour of an obstacle in each of the at least one image and a type of the obstacle. The output unit 13 issues an alert. Accordingly, the object detection device 10 achieves the goal of recognizing an obstacle in the vicinity of a vehicle.

The image acquiring unit 11 includes at least one CCD (Charge-Coupled Device) camera or at least one CMOS (Complementary Metal Oxide Semiconductor) camera mounted on a front end, a rear end, a left side or a right side of the vehicle to take at least one image around the vehicle or includes multiple CCD cameras or CMOS cameras to take a panoramic image around the vehicle and output the at least one image or the panoramic image to the image processing unit 12.

The image processing unit 12 may be a digital signal processor (DSP), field-programmable gate array (FPGA) or a micro-controller unit (MCU), and is built in with an image processing procedure 121. The image processing procedure 121 recognizes the obstacle in each of the at least one image outputted from the image acquiring unit 11.

The output unit 13 may be an LCD (Liquid Crystal Display) screen, an LED (Light-Emitting Diode) screen, a speaker or a buzzer, and outputs an obstacle alert signal generated after the image processing unit 12 recognizes the obstacle in each of the at least one image.

Figure 2:
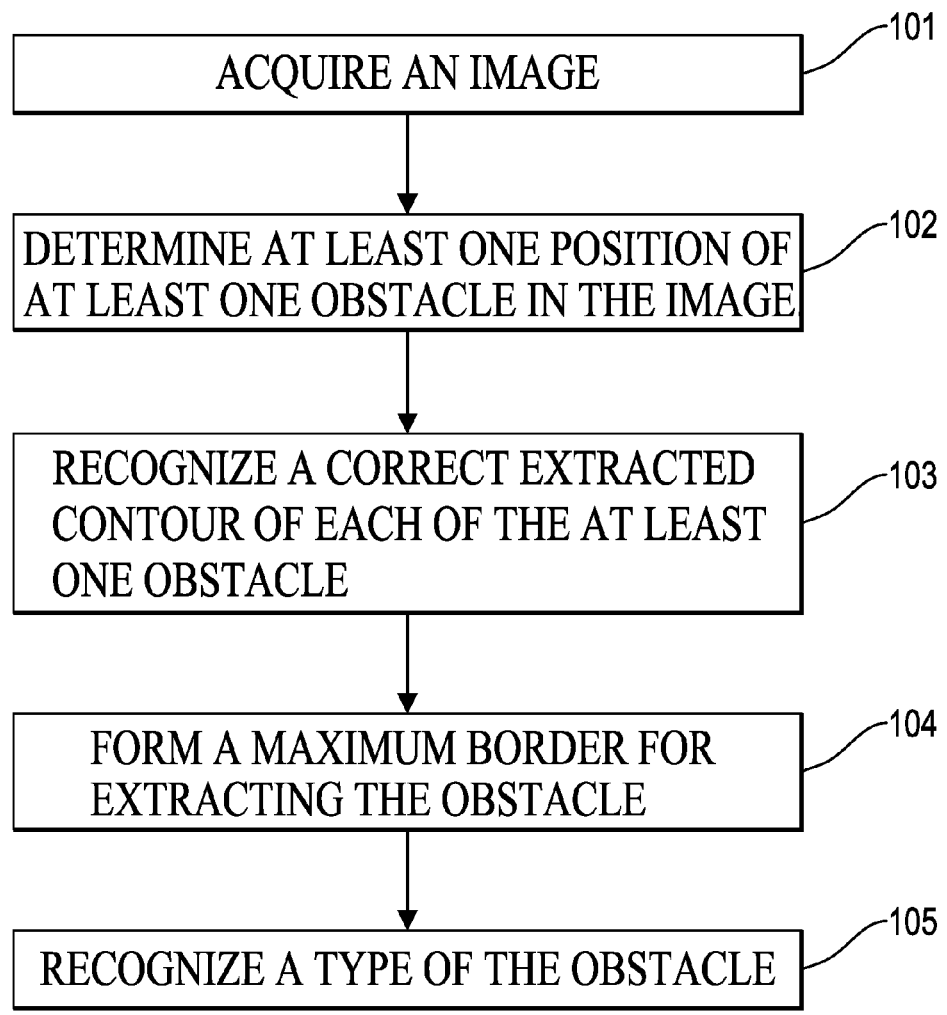
FIG. 2 is a flow diagram of an image processing procedure in accordance with the present invention.

With reference to FIG. 2, the image processing procedure 121 built in the image processing unit 12 has the following steps.

Step 101: Acquire an input image, which is image information taken by the image acquiring unit 11.

Step 102: Determine at least one position of at least one obstacle in the input image. The image information is detected for generation of at least one extracted range corresponding to the at least one obstacle. A boundary of each of the at least one extracted range of a corresponding obstacle is taken as an initial extracted contour of the obstacle.

Step 103: Recognize a correct extracted contour of each of the at least one obstacle. The correct extracted contour of the corresponding obstacle associated with a corresponding extracted range is obtained by using an algorithm for Poisson gradient vector flow based active deformable contour model. A multi-mesh algorithm with different grid sizes is adopted to increase the speed in computing the correct extracted contour of the corresponding obstacle. The algorithm for Poisson gradient vector flow based active deformable contour model is an obstacle extraction method, which starts actively conducting a contour change on each of the at least one obstacle once an initial extracted contour of the obstacle is obtained.

Step 104: Form a maximum border for extracting the obstacle. The correct extracted contour of each of the at least one obstacle forms the maximum border of the obstacle.

Step 105: Recognize a type of the obstacle. Provide a classifier to recognize the type of the obstacle according to the maximum border of the obstacle.

An equation of the foregoing algorithm for Poisson gradient vector flow based active deformable contour model is expressed as follows.

$$E = \int_0^1 \frac{1}{2} [\alpha|x'(s)|^2 + \beta|x''(s)|^2] + E_{ext}(x(s))ds$$

Where $\alpha$ is a tension parameter, $\beta$ is a rigidity parameter, and $E_{ext}$ is an external force field.

When the above equation converges, an equivalent result is that E has a minimum value. A functional differential equation of the above equation can be obtained through calculus of variations, and a result obtained after performing the variational method is expressed as follows.

$$\frac{\partial x(s,t)}{\partial t} = \alpha x^{(2)}(s,t) + \beta x^{(4)}(s,t) - \nabla E_{ext} \qquad (1)$$

Figure 3:
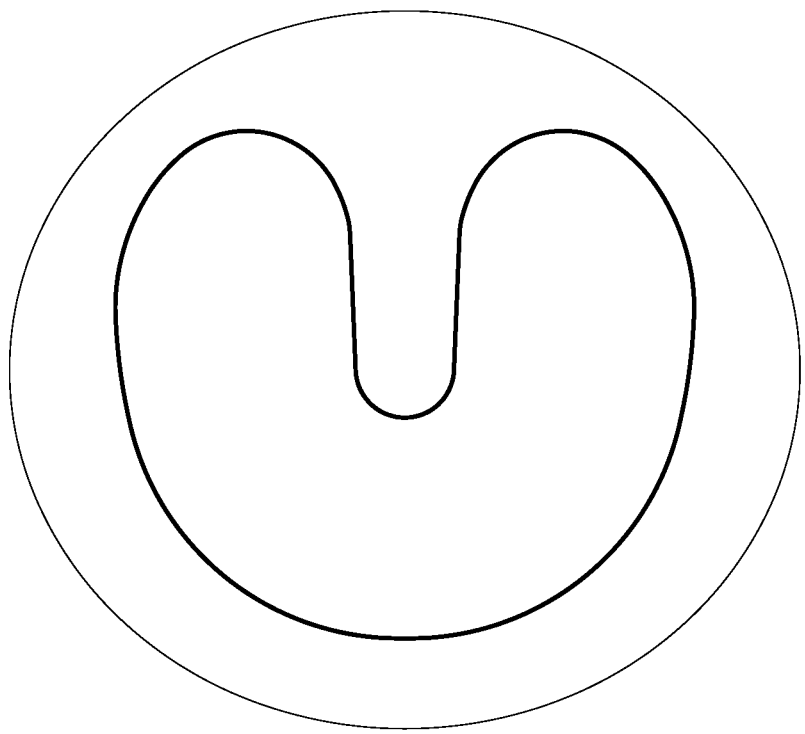
FIG. 3 is a schematic diagram of an obstacle and an initial extracted contour of the obstacle.
Figure 4:
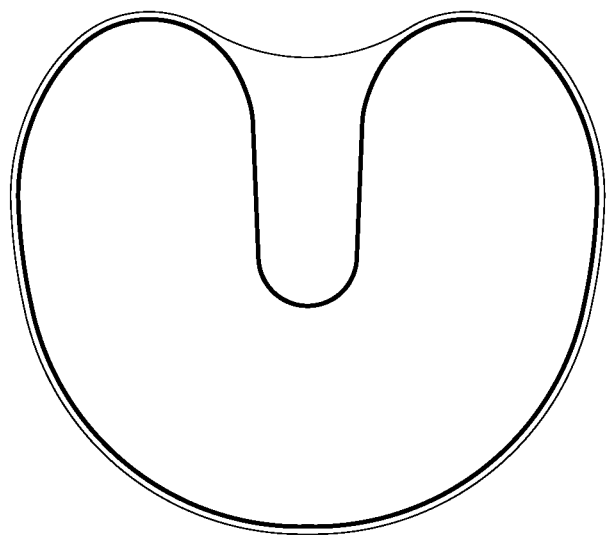
FIG. 4 is a schematic diagram of an extracted contour of the obstacle in FIG. 3 applied with an external force field and generated without using an algorithm for Poisson gradient vector flow based active deformable contour model.

When any portion of an actual contour of an obstacle has an exceedingly large curvature, the external force field $E_{ext}$ is hard to approach an actual contour of the portion. With reference to FIG. 3, a bold solid line represents an actual contour of an obstacle, and a thin solid line represents the initial extraction contour of the obstacle. With reference to FIG. 4, when the algorithm for Poisson gradient vector flow based active deformable contour model is not applied and the obstacle has a portion with an exceedingly large curvature as shown in an recessed portion of the obstacle, an extracted contour of the obstacle fails to approach the actual contour of the portion of the obstacle with the exceedingly large curvature.

A solution of the Poisson equation is taken as the external force field. Suppose that $$\nabla^2 \varnothing(x,y) = f_{edge}(x,y)$$

where $f_{edge}$ is a two-dimensional image obtained by using canny edge detection.

Figure 5:
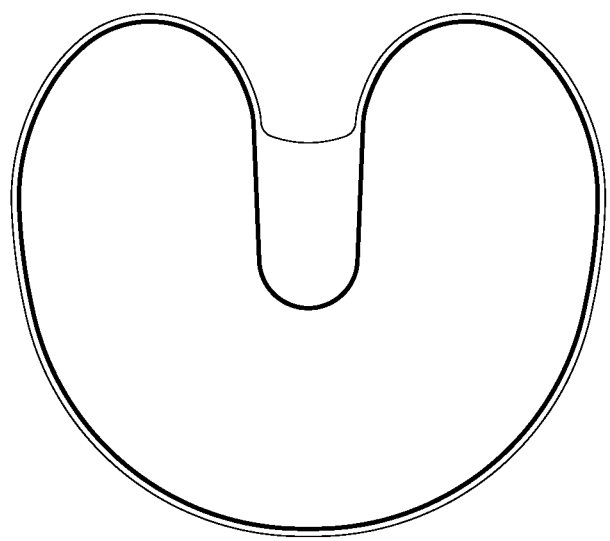
FIG. 5 is a schematic diagram of a contour of the obstacle in FIG. 3 applied with an external force field and generated by using the algorithm for Poisson gradient vector flow based active deformable contour model.
Figure 6:
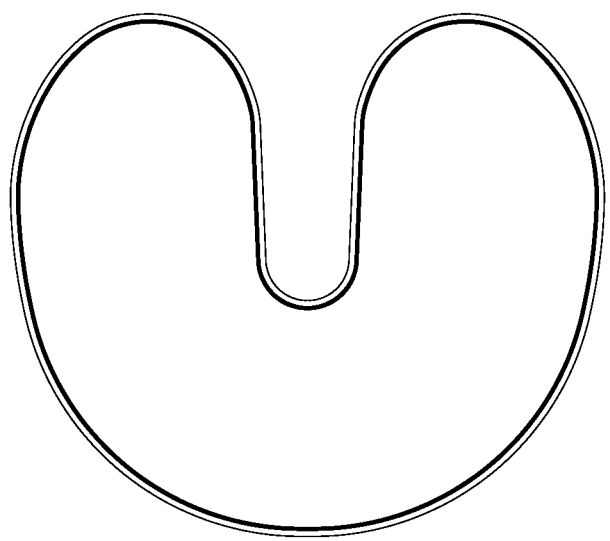
FIG. 6 is another schematic diagram of a contour of the obstacle in FIG. 3 generated by using the algorithm for Poisson gradient vector flow based active deformable contour model.

When $\varnothing$ is calculated, $-\nabla \varnothing$ is taken as $E_{ext}$ and is substituted into Eqn. (1) with the Poisson gradient vector flow taken as the external force field. When encountering an actual contour of the obstacle with an exceedingly large curvature, the Poisson gradient vector flow can still approach the actual contour of the recessed portion of the obstacle according to the curvature. With reference to FIGS. 5 and 6, given the Poisson gradient vector flow as the external force field for extracting the obstacle in FIG. 3, the initial extraction contour associated with the extracted range of the obstacle can still approach the actual contour of the recessed portion of the obstacle according to the curvature of the recessed portion when the curvature of the recessed portion is exceedingly large.

The algorithm for Poisson gradient vector flow based active deformable contour model utilizes the solution of the Poisson equation to replace a conventional method using image force or convolution as the external force field of an image, thereby effectively increasing performance on image segmentation and rendering the algorithm appropriate to all imaging systems with different fields of view.

Eqn. (1) can be solved through a finite differential method or a multi-mesh algorithm. The multi-mesh algorithm uses a variable grid size to solve the equation. As the static mesh algorithm employs a fixed number of grids, such as 3×3, 5×5, 9×9, 17×17 or 33×33 for calculation, each calculation is based on one fixed number of grids, and a following calculation is based on another fixed number of grids. Hence, an overall computing speed is slow. In contrast, the multi-mesh algorithm adopted by the present invention utilizes variable number of grids or grids with variable sizes for calculation to tackle the speed limitation arising from the static mesh algorithm, such as the finite differential method or the finite element method. Accordingly, the multi-mesh algorithm has a faster processing speed than the static mesh algorithm.

After the maximum border for extracting the obstacle is formed through the foregoing algorithm for Poisson gradient vector flow based active deformable contour model and the multi-mesh algorithm, the classifier is used to recognize or determine the type of the obstacle.

In sum, the present invention employs an embedded object detection device to detect an obstacle in an image. The object detection device utilizes the algorithm for Poisson gradient vector flow based active deformable contour model for converting image information into a flow field distribution, the calculus of variations for extracting a contour of the obstacle, and the multi-mesh algorithm for rapidly calculating out desired numerical values and achieving faster computing speed. Hence, when the embedded object detection device is mounted in a vehicle, a road detection range can be configured according to a corresponding field of view to the vehicle. It is unnecessary for the object detection device to be equipped with any additional sensor to perform conditional determination based on a specific road safety scenario and to provide dynamic object detection and recognition and an alerting function. Accordingly, the present invention enhances the recognition accuracy of a classifier, and resolves the issues of conventional dynamic object detection and image recognition methods including an increased false recognition rate, being time consuming in computation, and integration difficulty with existing vehicle systems.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An object detection method with a rising classifier effect performed by an object detection device embedded in a vehicle, the method comprising steps of:
    acquiring image information;
    determining at least one position of at least one obstacle in the image information, wherein the image information is detected for generation of at least one extracted range corresponding to the at least one obstacle, and a boundary of each of the at least one extracted range is taken as an initial extracted contour of the obstacle;
    recognizing an extracted contour of each of the at least one obstacle, wherein the extracted contour of each of the at least one obstacle associated with a corresponding extracted range is obtained by using an algorithm for Poisson gradient vector flow based active deformable contour model and a multi-mesh algorithm with different grid sizes; and
    forming a maximum border of the extracted contour of each of the at least one obstacle for a classifier to recognize a type of the obstacle according to the maximum border of the obstacle.

2. The object detection method as claimed in claim 1, wherein in the step of recognizing an extracted contour, the algorithm for Poisson gradient vector flow based active deformable contour model starts actively conducting a contour change on each of the at least one obstacle once the initial extracted contour of the obstacle is obtained.

3. The object detection method as claimed in claim 2, wherein in the step of recognizing an extracted contour, the algorithm for Poisson gradient vector flow based active deformable contour model converts the image information into a flow field distribution, a calculus of variations is used to determine the extracted contour of each of the at least one obstacle, and the multi-mesh algorithm calculates out numerical values at a faster computing speed than static mesh algorithms with fixed number of grids.

4. The object detection method as claimed in claim 1, wherein an equation of the algorithm for Poisson gradient vector flow based active deformable contour model is expressed by:

$$E = \int_0^1 \frac{1}{2} [\alpha|x'(s)|^2 + \beta|x''(s)|^2] + E_{ext}(x(s))ds$$

where $\alpha$ is a tension parameter, $\beta$ is a rigidity parameter, and $E_{ext}$ is an external force field.

5. The object detection method as claimed in claim 2, wherein an equation of the algorithm for Poisson gradient vector flow based active deformable contour model is expressed by:

$$E = \int_0^1 \frac{1}{2} [\alpha|x'(s)|^2 + \beta|x''(s)|^2] + E_{ext}(x(s))ds$$

where $\alpha$ is a tension parameter, $\beta$ is a rigidity parameter, and $E_{ext}$ is an external force field.

6. The object detection method as claimed in claim 3, wherein an equation of the algorithm for Poisson gradient vector flow based active deformable contour model is expressed by:

$$E = \int_0^1 \frac{1}{2} [\alpha|x'(s)|^2 + \beta|x''(s)|^2] + E_{ext}(x(s))ds$$

where $\alpha$ is a tension parameter, $\beta$ is a rigidity parameter, and $E_{ext}$ is an external force field.

7. An object detection device with a rising classifier effect embedded in a vehicle and comprising:
    an image acquiring unit outputting at least one image;
    an image processing unit electrically connected to the image acquiring unit, built in with an image processing procedure recognizing an obstacle in each of the at least one image with an algorithm for Poisson gradient vector flow based active deformable contour model and a multi-mesh algorithm with different grid sizes; and
    an output unit electrically connected to the image processing unit and outputting an obstacle alert signal generated after the image processing unit recognizes the obstacle in each of the at least one image.

8. The object detection device as claimed in claim 7, wherein the image processing procedure has steps of:
    acquiring image information;
    determining at least one position of at least one obstacle in the image information, wherein the image information is detected for generation of at least one extracted range corresponding to the at least one obstacle, and a boundary of each of the at least one extracted range of a corresponding obstacle is taken as an initial extracted contour of the obstacle;

recognizing an extracted contour of each of the at least one obstacle, wherein the extracted contour of each of the at least one obstacle associated with a corresponding extracted range is obtained by using the algorithm for Poisson gradient vector flow based active deformable contour model and the multi-mesh algorithm; and forming a maximum border of the extracted contour of each of the at least one obstacle for a classifier to recognize a type of the obstacle according to the maximum border of the obstacle.

9. The object detection device as claimed in claim 7, wherein the output unit is one of an LCD (Liquid Crystal Display) screen, an LED (Light-Emitting Diode) screen, a speaker and a buzzer.

10. The object detection device as claimed in claim 7, wherein the image acquiring unit includes at least one CCD (Charge-Coupled Device) camera or at least one CMOS (Complementary Metal Oxide Semiconductor) camera.

11. The object detection device as claimed in claim 7, wherein the image processing unit is one of a digital signal processor (DSP), a field-programmable gate array (FPGA) and a micro-controller unit (MCU).

* * * * *